Jan. 29, 1952   R. K. SMITH   2,583,608
DISTRIBUTOR FOR DUST AND AGGREGATE
Filed May 21, 1948   3 Sheets-Sheet 1
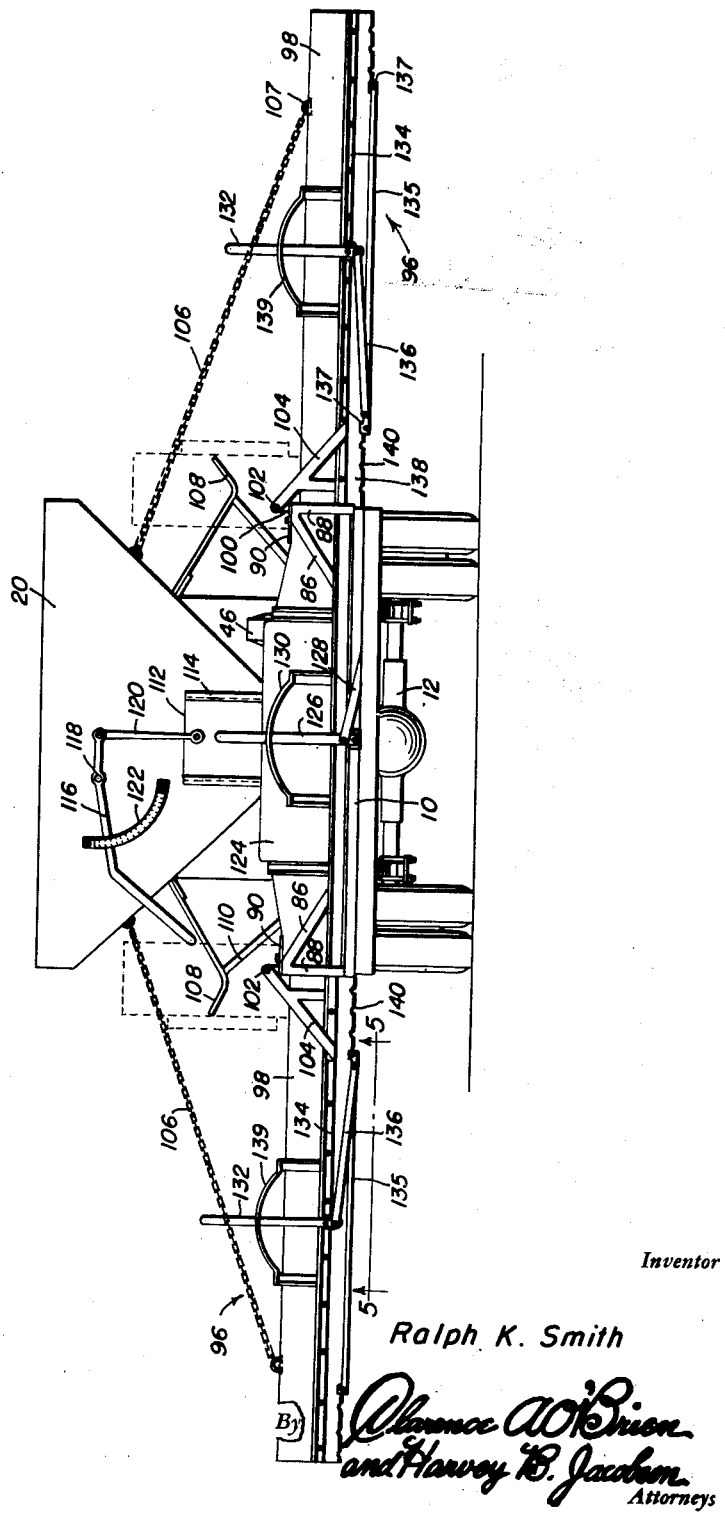
Inventor
Ralph K. Smith Jan. 29, 1952 R. K. SMITH 2,583,608
DISTRIBUTOR FOR DUST AND AGGREGATE
Filed May 21, 1948 3 Sheets-Sheet 2
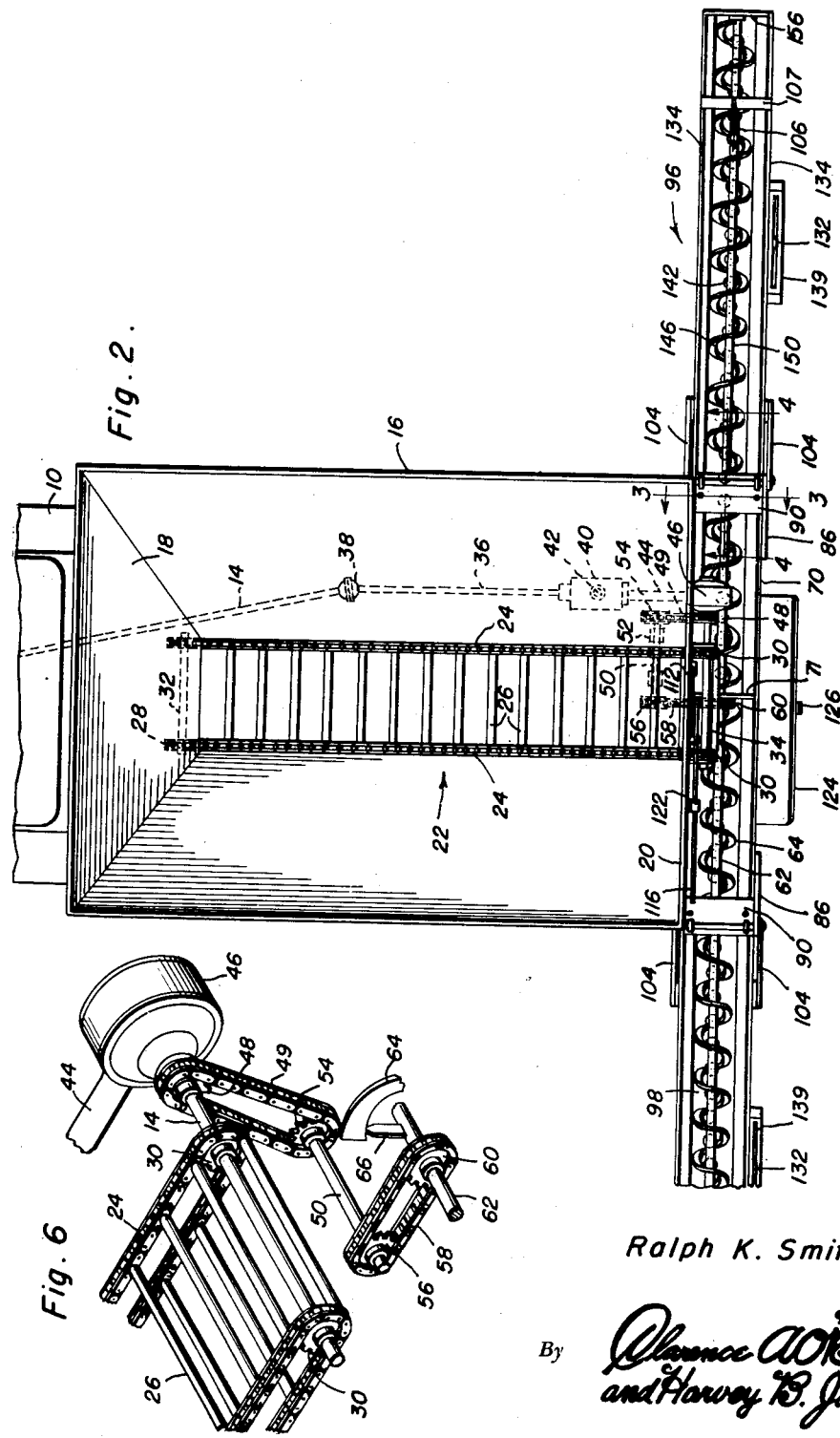
Inventor
Ralph K. Smith Jan. 29, 1952  R. K. SMITH  2,583,608
DISTRIBUTOR FOR DUST AND AGGREGATE
Filed May 21, 1948  3 Sheets-Sheet 3
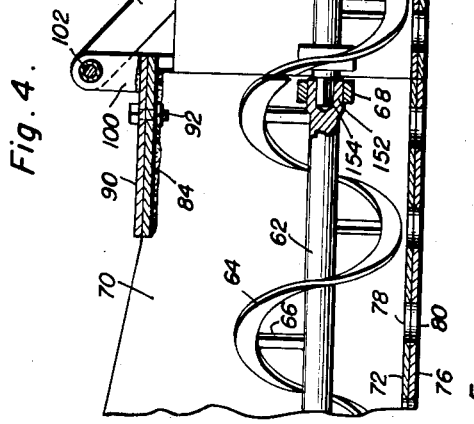
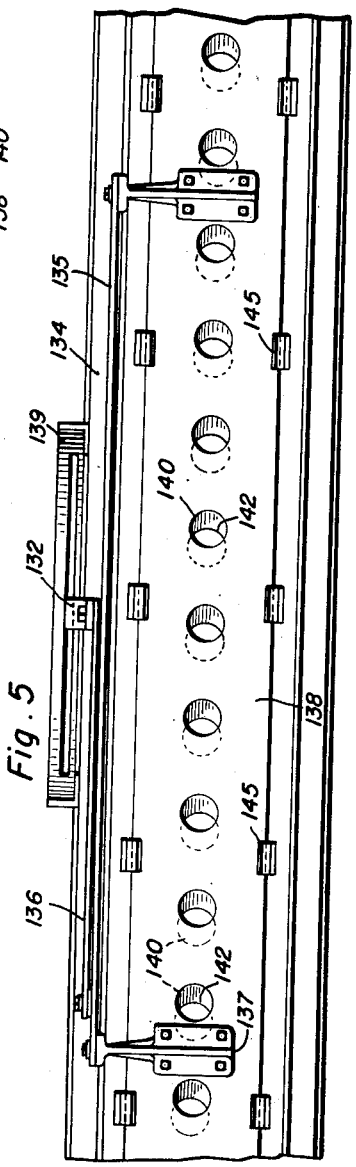
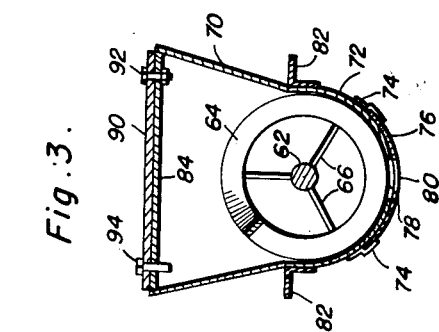
Inventor
Ralph K. Smith
By Clarence A. O'Brien
and Harvey B. Jacobson
Attorneys Patented Jan. 29, 1952

2,583,608

UNITED STATES PATENT OFFICE 2,583,608

DISTRIBUTOR FOR DUST AND AGGREGATE

Ralph K. Smith, Rawson, Ohio

Application May 21, 1948, Serial No. 28,339

2 Claims. (Cl. 275—2)

This invention relates generally to agricultural implements, and more particularly to a distributor for dust, aggregate and the like.

It is a primary object of this invention to provide an implement with improved means whereby material delivered to the rear of the implement by a conveyor disposed longitudinally thereof is distributed evenly throughout the width of the implement and also distributed throughout a wide swath on each side of the implement as the same is drawn forward, improved means for allowing the laterally disposed distributing units to be pivoted and folded upon the sides of the implement when the same are not in use, thereby providing a construction for implements of this nature wherein the total width of the implement when the lateral members are so folded is not greater than the width of the main portion of the implement by any great degree, the implement being thereby adapted for easy transport from field to field and along a highway.

Another object of this invention is to provide means whereby the material distributed may be controlled as to concentration of deposit in each of the laterally disposed and pivoted distributing units independently of the similar control of the rate of flow of material in the other sections of the implement.

Still another object of this invention is to provide convenient means whereby the rate of flow of material from each of the sections may be simultaneously increased or decreased.

Still another object of this invention is to provide a distributor of this character which can be used to distribute material of greatly varying particle size and which will distribute material satisfactorily even though this material is such as will clog other types of machines designed for a similar purpose, the latter feature being primarily the result of an improved spiral conveyor construction.

Still another object of this invention, allied to certain preceding objects, is to provide improved means whereby the shifting of the lateral distributing assemblies into operative position, from an inoperative position, is a matter of ultimate simplicity, and the procedure in shifting the same assemblies into inoperative positions is similarly easily accomplished.

And a last object to be mentioned specifically, is to provide a machine of this type which is relatively inexpensive and practical to manufacture, which is safe, convenient and very safe to use, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is an end elevational view of the assembled machine;

Figure 2 fragmentary top plan view of the assembled machine, the means for connecting the conveyors to the power unit of the implement being indicated in dash lines since these parts are hidden beneath the hopper-like body of the implement;

Figure 3 is a transverse vertical section, taken on a line 3—3 in Figure 2;

Figure 4 is a longitudinal vertical sectional view, taken substantially upon a center line 4—4 in Figure 2;

Figure 5 is a lower plan view, fragmentary in character, of one of the assemblies which are hereinafter referred to as lateral conveyors; and Figure 6 is a three dimensional view showing a portion of the power transmission means on an enlarged scale.

Similar characters of reference designate similar or identical elements and portions throughout the specification and throughout the several views of the drawings.

Referring now to the drawings in detail, this invention is adapted to be incorporated with a vehicle body or chassis having longitudinal frame members 10, a rear axle assembly 12 and power means, not shown but adapted to be connected with a power take-off extension shaft 14. This chassis supports a body of hopper-like construction having sloping side walls 16, a sloping front panel 18 and a substantially vertical rear panel 20. A trough is formed at the bottom of said body to receive material sliding down the sloping panels, and a conveyor, generally indicated by the numeral 22, is operatively mounted in the bottom portion of this body. The conveyor includes a pair of endless laterally disposed sprocket chains 24, a pair of front sprockets 28 and a pair of rear sprockets 30 carried on shafts indicated at 32 and 34, respectively, the front shaft 32 being freely journaled in any adjacent fixed structure of the body and the rear shaft 34 being hereinafter referred to as the drive shaft for reasons which shall appear presently. The power take-off extension shaft 14 has already been referred to and this shaft is connected to another shaft extension 36 by means of a universal joint 38, suitable bearings being provided for these shafts. A transmission 40, having a gear shift lever 42 is connected to the shaft extension 36 and a stub shaft 44 connects the transmission 40 operatively with a set of reduction gears within a housing 46. The drive shaft 34 is driven by the said gears within the housing 46, and it will be understood that suitable bearings are provided for the shaft 34, and that the transmission 40 and housing 46 will be rigidly mounted upon any fixed structure of the frame or chassis 10 adjacent thereto.

A jack shaft 50, mounted in bearings 52 beneath the conveyor 22 and near the rear end of the machine, carries the sprocket wheels 54 and 56. A sprocket wheel 48 on the drive shaft 34 is connected by means of a sprocket chain 49 with the sprocket wheel 54 and another chain 58 operatively connects the sprocket wheel 56 with a sprocket wheel 60 rigidly mounted on the central shaft 62 of the spiral conveyor 64.

The spiral conveyor 64 is spaced from and connected to the shaft 62 by means of radial spoke members 66, and suitable bearings 68, best indicated in Figure 4, are used to support the spiral conveyor from the ends therof, the bearings 68 being secured to portions of the hopper 70. It should be noted that the conveyor 22 extends rearwardly of the vertical rear end panel 20 of the main hopper body of the implement so that material delivered therefrom will fall substantially centrally into the hopper 70 and it should be further carefully noted that this hopper is preferably partitioned as indicated at 71, the spiral conveyor 64 being of dual nature adapted to force material from the center thereof in opposite directions.

The hopper 70 is provided with a bottom plate 72 which is arcuate in cross section and a plurality of spaced guide brackets 74 of angle plate character are secured to the arcuate bottom plate 72 of the hopper, so that a slide plate 76 of similarly arcuate cross section shape may be mounted on the outer or under side thereof. The bottom plate 72 is provided with a plurality of longitudinally spaced apertures 78 and the slide plate 76 is provided with a similar number of registering apertures 80, that is, the slide plate may be positioned so that these apertures register in order that material from the hopper 70 may escape through the registering apertures 78 and 80.

The hopper may be supported by transverse angle irons 82, and turntables 84, indicated in Figure 3, are mounted across the ends of the hopper 70, the supporting structure therefore including brace members 86 and 88, the detail of which is relatively unimportant in this application. But it should be noted that the turntable 84 have plates 90 pivoted thereon by axis bolts 92 so that these plates may be turned in a horizontal plane relative to the turntables 84. Locking pins 94 are insertable through apertures in the turntables 84 and the plates 90 when the plates are disposed as indicated in Figures 1 and 3. On each side of the machine similar lateral conveyors, generally indicated by the numeral 96, are pivotally mounted. Each of these lateral conveyors, includes a trough 98, and hinge structure for connecting the lateral conveyors to to the ends of the machine adjacent the ends of the hopper 70 include upright lugs 100 on the plates 90, hinge pins 102 and brace structure 104 on each lateral conveyor.

It will be clear that the foregoing structure provides for pivotal movement of the lateral conveyors in two planes, that is, the lateral conveyors can be pivoted on a horizontal plane about the axis bolts 92, when the locking pins 94 are withdrawn, and the lateral conveyors 96 may also be pivoted through small angles so that their front ends are disposed higher than rear ends by pivoting about axis bolts 102. The front end of each lateral conveyor is considered as that end of the lateral conveyor which is disposed toward the front of the machine when in inoperative position, that is, when the lateral conveyor is supported in one of the cradles 108 disposed laterally of the sides 16 of the vehicle body. These cradles are provided with inclined brackets 110 and have curved seats to receive the forward ends of the lateral conveyors when the same are disposed in inoperative positions. A pair of chains 106 are also connected to the sides 16 and to cross bars 107 on the lateral conveyors 96, as well illustrated in Figures 1 and 2.

Means for controlling the flow of material into the hopper 70 will include a door 112 mounted on the suitably apertured rear vertical panel 20 by means of guide rails 114. A control lever 116, pivoted as at 118 on the said vertical panel 20, together with a link 120, is used to raise and lower the door 112 to secure the desired opening, and an arcuate lever holder 122 is mounted upon the rear panel 20 and provided with notches or other means whereby the lever is held in the position desired by the operator of the machine. A baffle 124 is supported by any suitable means across the rear side of the hopper 70 and adjacent to the opening closed by the door 112, this baffle 124 being designed to prevent material from being cast directly to the rear of the machine, rather than into the hopper 70, during the operation of the machine. Further means for controlling the flow includes a lever 126 mounted on any adjacent fixed structure at the rear of the machine and connected to the slide plate 76 so that the latter may be shifted, the connection being made by means of a link 128 terminally and pivotally secured to the lever 126 and to the slide plate 76. An arcuate lever holder 130 will also be mounted on adjacent fixed structure, such as the baffle plate 124 for holding the lever 126 in the position desired by the operator, so that the apertures 80 in the slide plate 76 may be made to register partialy or wholly with the apertures 78 in the bottom plate 72.

Means for controlling flow of material from the troughs 98 is very similar to the structure described immediately above. A lever 132 is pivoted on angle iron reinforcement plates on each of the lateral conveyors 96, these reinforcement plates being preferably of angle iron as indicated at 134, and the levers 132 are connected to links 136 which are, in turn, pivotally secured to elongated bars 135 connected by brackets 137 to slide plates 138 provided in each lateral conveyor. Arcuate slotted lever holding and guiding members 139 are mounted upon the angle iron reinforcement plates 134 for coaction with the levers 132. In a construction similar to that described in connection with the hopper 70, each of the lateral conveyors is also provided with fixed plates 144 which have apertures 142 adapted to be made to register partially or wholly with the apertures 140 in the slide plates 138 when it is desired to have material distributed from these lateral conveyors onto the ground as the machine is propelled forwardly. The slide plates 138 are supported by arcuate brackets 145 spaced along and secured to the fixed plates 144 and marginally and frictionally associated with the slide plates 138, as best illustrated in Figure 5. Each lateral conveyor has a spiral conveyor member 146 carried on radial spoke members 148 and shafts 150, and it will be noted that the ends of the shafts 62 are provided with sockets 152 and the inner ends of the shafts 150 are provided with inversely shaped projecting end portions 154, Figure 4 illustrating sockets 152 which are square in cross section and end portions 154 which are also square in cross section, and it will be understood that when the lateral conveyors are in the positions indicated in the drawings, the above structure will allow torque to be transmitted from the shaft 62 to each of the shafts 150. The ends of the lateral conveyors may be closed by end plates 156.

The operation of this invention will be clearly understood from the foregoing description of the mechanical details thereof, taken in connection with the drawings and the recitation of objects sought to be achieved by this invention. It will clear that material will be moved from the body of the implement rearwardly by the conveyor 22 into the hopper 70, where it is divided into two portions by the partition 71 and moved laterally in two directions by the dual spiral conveyor 64. Normally the lateral conveyors 96 will be positioned as shown in the drawings and their spiral conveyors 146 will move the material gradually along the length of each lateral conveyor, while the controlled openings 140 and 142 will allow the material to be distributed on the land as the machine is moved. Material will also be distributed immediately to the rear of the machine through the openings 78 and 80 in the base of the hopper 70. It will be clear that all of the objects recited above are amply achieved by this invention and it will be also evident that minor variations may be made in the exact construction of the various elements of this invention and proportionment of these elements, without departure from the spirit and scope of this invention. Accordingly this invention should be limited only in accordance with a proper interpretation of the terminology used in the subjoined claims.

Having described the invention, what is claimed as new is:

1. In an ambulant distributor for dust and aggregate comprising a wheeled frame, a hopper-like body to contain material to be distributed and having a trough disposed longitudinally thereof, a transverse hopper at the rear end of said trough, a conveyor in said trough to deliver material into said hopper, a spiral conveyor in said hopper and divided to carry said material toward opposite ends of the hopper, lateral conveyors supported at said ends of the hopper and extending colinearly therewith, said lateral conveyors each including a trough with a spiral conveyor operatively mounted therein, said hopper and lateral conveyors having base plates arcuate in cross-section, regularly spaced apertures in said base plates, slide plates with similar apertures slidably mounted on said base plates, means to slide said slide plates individually with respect to corresponding base plates and longitudinally of said base plates to control the degree of registration of said apertures, means to control the rate of flow of material from said body to said hopper including an apertured panel in the hopper-like body and a vertically adjustable door for the aperture in the panel, and means to operate said spiral conveyors, said lateral conveyors having supporting means comprising fixed turning supporting means comprising fixed turntables at the ends of the hopper, plates pivoted on the turntables to allow pivotal movement of the plates in a horizontal plane, upright lugs on the plates, said lateral conveyors being hinged to said plates for pivotal movement relative thereto in vertical planes.

2. In an ambulant distributor for dust and aggregate comprising a wheeled frame, a hopper-like body to contain material to be distributed and having a trough disposed longitudinally thereof, a transverse hopper at the rear end of said trough, a conveyor in said trough to deliver material into said hopper, a spiral conveyor in said hopper and divided to carry said material toward opposite ends of the hopper, material conveyors supported at said ends of the hopper and extending colinearly therewith, said lateral conveyors each including a trough with a spiral conveyor operatively mounted therein, said hopper and lateral conveyors having base plates arcuate in cross-section, regularly spaced apertures in said base plates, slide plates with similar apertures slidably mounted on said base plates, means to slide said slide plates individually with respect to corresponding base plates and longitudinally of said base plates to control the degree of registration of said apertures, means to control the rate of flow of material from said body to said hopper including an apertured panel in the hopper-like body and a vertically adjustable door for the aperture in the panel, and means to operate said spiral conveyors, said lateral conveyors having supporting means comprising fixed turntables at the ends of the hopper, plates pivoted on the turntables to allow pivotal movement of the plates in a horizontal plane, upright lugs on the plates, said lateral conveyors being hinged to said plates for pivotal movement relative thereto in vertical planes, and said plates and turntables having apertures which register when the conveyors are in operative positions, and pins removably secured in said apertures to lock the lateral conveyors in said operative positions.

RALPH K. SMITH.

REFERENCES CITED

The following references are of record in the file of this patent:

UNITED STATES PATENTS

| Number | Name | Date |
|---|---|---|
| 435,757 | Lehman | Sept. 2, 1890 |
| 998,769 | Harker | July 25, 1911 |
| 1,623,743 | McGuiness | Apr. 5, 1927 |
| 1,668,516 | Litchfield et al. | May 1, 1928 |
| 2,221,266 | Roach | Nov. 12, 1940 |
| 2,293,977 | Hoffstetter | Aug. 25, 1942 |
| 2,350,107 | Gandrud | May 30, 1944 |
| 2,350,476 | Richey | June 6, 1944 |
| 2,369,755 | Rosselot | Feb. 20, 1945 |
| 2,500,681 | Hoffstetter | Mar. 14, 1950 |